(No Model.)
J. W. COATES.
TWO WHEELED VEHICLE.
No. 394,061. Patented Dec. 4, 1888.
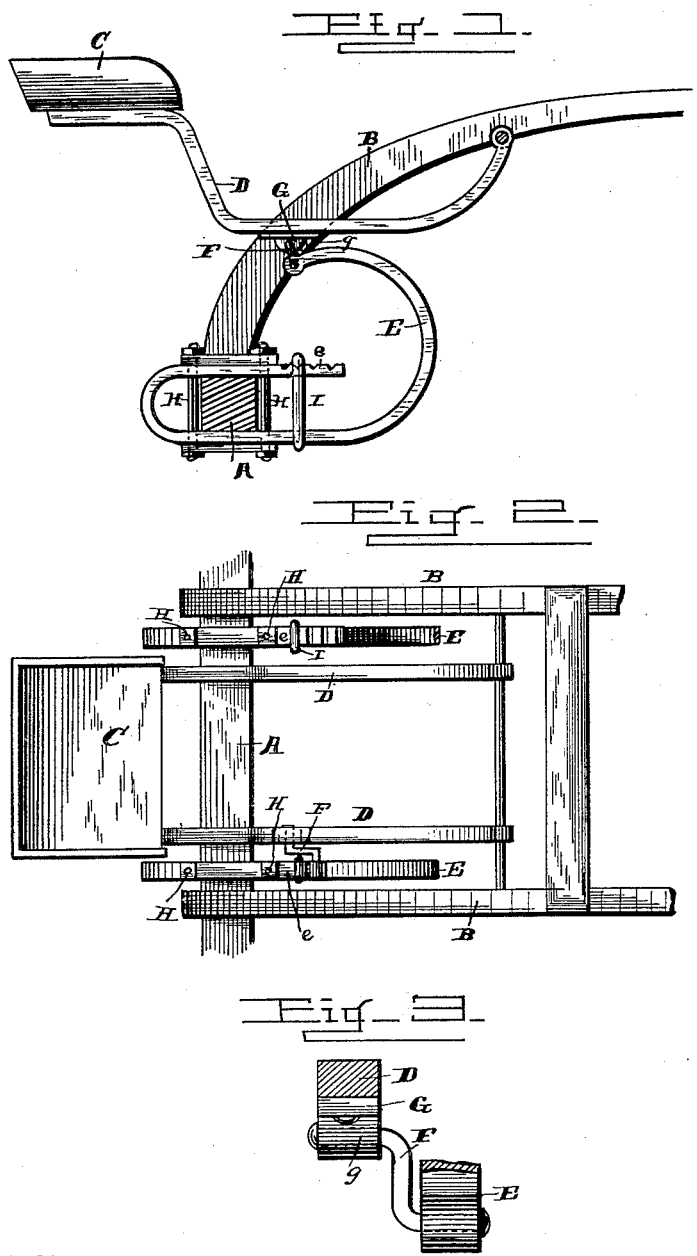

UNITED STATES PATENT OFFICE.

JAMES W. COATES, OF SOUTH BEND, INDIANA.

TWO-WHEELED VEHICLE.

SPECIFICATION forming part of Letters Patent No. 394,061, dated December 4, 1888.

Application filed May 9, 1888. Serial No. 273,318. (No model.)

*To all whom it may concern:*

Be it known that I, JAMES W. COATES, of South Bend, in the county of St. Joseph and State of Indiana, have invented certain new and useful Improvements in Two-Wheeled Vehicles; and I do hereby declare that the following is a full, clear, and exact description thereof, reference being had to the accompanying drawings, and to the letters of reference marked thereon, which form part of this specification, in which—

Figure 1 is a side elevation of my improved vehicle with the wheels removed. Fig. 2 is a plan view of same, partly in section. Fig. 3 is a detail.

This invention relates to an improved sulky or two-wheeled vehicle; and it has for its objects to provide adjustable tension devices for the springs thereof and to improve the construction of the springs; and it consists in the hereinafter-described construction and novel arrangement of parts.

In the drawings, letter A indicates the axle of a wheel; B, the thills attached thereto, and C the body mounted on the curved bars D, attached to the thills, as shown.

E E represent the springs, which are somewhat similar to the ordinary C-springs, and have eyes in their upper ends, in each of which is journaled one arm of a short rocking crank-rod, F, the other arm of which is journaled in the eye *g* of a bracket, G, securely attached to the under surface of the adjoining bar D, as shown. From their attachment to rods F the springs E are bent forward, downward, and backward under the axle A, as shown.

*e e* are short spring-bars, secured to the axle above and parallel with the lower portions of springs E, as shown. If desired, the ends of springs E may be bent around the axle and extended forward parallel with their lower portion, as shown. The springs are secured to the axle by proper clips or bolts, H H, as shown, so that they cannot move laterally.

Spring-bars *e e* are notched in their upper surfaces, as shown, for engaging links I I, which are placed on the springs E, as shown. It will be seen from the drawings that the links I will support or suspend the main portions of the springs upon the bars *e e*. Practically, by adjusting links I on bars *e* farther from or closer to the axles, I shorten or lengthen the spring, thereby stiffening or flexing it, and thus I am enabled to adjust the tension of the spring to light or heavy loads. The spring-bars *e*, being yielding, also give somewhat to the main portion of the spring, and thus serve to cushion the latter when the vehicle is subject to heavy jolting. The use of the cranked bar F permits the springs E to more readily and easily sway with the body bars, and in a measure relieve the springs from torsional and longitudinal strain.

Having described my invention, I claim—

1. In a vehicle, the combination of the axles and body with the curved springs extending beneath the axle, the spring-bars secured to and above the axle and extending forward over the curved springs, and the links adjustably connecting said springs and bars, all constructed and arranged substantially as and for the purpose described.

2. The combination of the axle and body with the curved springs, cranked rods, notched spring-bars, and link-connections between said spring-bars and springs, all constructed and arranged substantially as and for the purpose described.

3. The combination of the body, body-bars, and axle with the bent springs, the crank-rods connecting said springs and body-bars, the notched spring-bars clipped to the axle parallel with the springs, and the adjustable links on said spring-bars, all constructed and arranged substantially as specified.

In testimony that I claim the foregoing as my own I affix my signature in presence of two witnesses.

JAMES W. COATES.

Witnesses:
JAMES DU SHANE,
CHAS. WOOLVERTON.